(12) United States Patent
Sze To et al.

(10) Patent No.: US 10,159,925 B2
(45) Date of Patent: Dec. 25, 2018

(54) ACOUSTIC AIDED AIR FILTER AND A METHOD OF AIR FILTRATION THEREOF

(71) Applicant: Aurabeat Holdings Limited, Hong Kong (HK)

(72) Inventors: Gin Nam Sze To, Hong Kong (HK); Steven Nai-Kin Chan, Hong Kong (HK)

(73) Assignee: Aurabeat Holdings Limited, Hong Kong (HK)

( * ) Notice: Subject to any disclaimer, the term of this patent is extended or adjusted under 35 U.S.C. 154(b) by 53 days.

(21) Appl. No.: 15/399,772

(22) Filed: Jan. 6, 2017

(65) Prior Publication Data

US 2017/0197171 A1    Jul. 13, 2017

Related U.S. Application Data

(60) Provisional application No. 62/277,477, filed on Jan. 12, 2016.

(51) Int. Cl.
 *B01D 46/00* (2006.01)
 *B01D 46/42* (2006.01)
 *B03C 3/017* (2006.01)

(52) U.S. Cl.
 CPC ..... *B01D 46/4227* (2013.01); *B01D 46/0002* (2013.01); *B01D 46/0028* (2013.01);
 (Continued)

(58) Field of Classification Search
 CPC ............ B01D 2273/02; B01D 2273/24; B01D 2247/02; B01D 2247/102; B01D 2259/80;
 (Continued)

(56) References Cited

U.S. PATENT DOCUMENTS 2,769,506 A     11/1956   Abboud
2,782,927 A  *   2/1957   Derrick, Jr. ........ B01D 46/0046
                                                            209/250
(Continued)

FOREIGN PATENT DOCUMENTS

CN       1365423 A    8/2002
CN    101128652 A     2/2008
(Continued)

OTHER PUBLICATIONS

Search Report issued by the Chinese Patent Office dated Apr. 22, 2016.
(Continued)

*Primary Examiner* — T. Bennett McKenzie

(57) ABSTRACT

An air filter and a method of air filtration using the said air filter are described. The air filter may comprise a filter media layer adapted to capture and filter one or more impurities from air. The air filter may further comprise one or more acoustic wave generating means attached at one or more sides of the filter media layer. The one or more acoustic wave generating means may generate acoustic waves to be propagated into the filter media layer. The propagation of the acoustic waves into the filter media layer may facilitate the filter media layer to enhance the filtration efficiency of the air filter. The air filter may further comprise a pre-programmed chip to control the frequency of the acoustic waves generated. Further, air filter may comprise a battery adapted to supply power to the one or more acoustic wave generating means and the pre-programmed chip.

9 Claims, 9 Drawing Sheets

(52) U.S. Cl.
CPC ..... *B01D 46/0032* (2013.01); *B01D 46/0053* (2013.01); *B01D 46/4245* (2013.01); *B03C 3/017* (2013.01); *B01D 2273/24* (2013.01)

(58) Field of Classification Search
CPC ..... B01D 46/00–46/546; B01D 24/305; B01D 46/4227; B03C 3/017; B03C 3/0175
USPC ........... 95/57–81; 55/385.1–385.8, 490–519, 55/282–305; 210/384, 388, 389
See application file for complete search history.

(56) References Cited

U.S. PATENT DOCUMENTS

| | | | | |
|---|---|---|---|---|
| 4,201,556 | A * | 5/1980 | Olsson | B01D 46/0076 55/292 |
| 7,329,298 | B1 * | 2/2008 | Hasinski | B01D 39/12 123/198 E |
| 2003/0192432 | A1 * | 10/2003 | Gubler | B01D 46/0058 95/280 |
| 2004/0020367 | A1 * | 2/2004 | Soane | B01D 46/0001 96/226 |
| 2004/0231307 | A1 * | 11/2004 | Wood | B01D 39/2068 55/523 |
| 2005/0077227 | A1 | 4/2005 | Kirker | |
| 2005/0091784 | A1 * | 5/2005 | Bone | A47L 5/24 15/344 |
| 2008/0115473 | A1 * | 5/2008 | Miller | B01D 46/10 55/385.6 |
| 2008/0236115 | A1 * | 10/2008 | Sakashita | B01D 46/244 55/385.3 |
| 2009/0217651 | A1 * | 9/2009 | Jobson | B01D 51/08 60/299 |
| 2011/0000174 | A1 * | 1/2011 | Kapelarie | B01D 46/2414 55/492 |

FOREIGN PATENT DOCUMENTS

| | | |
|---|---|---|
| CN | 103691249 A | 4/2014 |
| DE | 10321921 A1 | 12/2004 |
| WO | 2012147050 A1 | 11/2012 |

OTHER PUBLICATIONS

European Search Report of counterpart European Patent Application No. 17151064.7 dated May 31, 2017.

* cited by examiner

ACOUSTIC AIDED AIR FILTER AND A METHOD OF AIR FILTRATION THEREOF

CROSS-REFERENCE TO RELATED APPLICATIONS AND PRIORITY

The present application claims priority from U.S. Provisional Patent Application. No. 62/277,477 filed on Jan. 12, 2016, the entirety of which is incorporated herein by reference.

TECHNICAL FIELD

The present application described herein, in general, relates to a field of air filtration, and more particularly to an acoustic aided air filter and a method thereof enabling the air filtration.

BACKGROUND

In the present scenario, more than 80% of air filter's life cycle cost is an energy cost, which is due to an extra energy consumed by a driving fan to overcome a pressure drop of an air stream flowing across the air filter while maintaining a designated air flow rate. It has been observed that, higher is a filtration efficiency of the air filter, greater is the pressure drop across the filter thereby resulting in higher consumption of the energy.

Today, every building equipped with a centralized air conditioning has one or more air filters in each of their air handling units, indicating that air filtration plays an important role in indoor environmental quality as well as taking a significant portion of energy consumption in the buildings. High efficiency air filtration is also essential in semiconductor and pharmacy manufacturing industries as well as medical facilities. High Efficiency Particulate Air (HEPA) filter often includes densely packed fiber material, which is both cost and energy expensive.

The Air filter generally has a lower filtration efficiency on smaller particles, which has a more significant impact on health and on manufacturing processes that require clean air environment. To effectively remove these very fine particles, densely packed filter media is usually used, which results in high pressure drop across the filter. High efficiency air filter generally has a higher filtration efficiency on particles with size larger than 1 micrometer than the value indicated by the efficiency rating of the High efficiency air filter.

There have been efforts made in the past on refining the micro and mini structure of air filter to reduce the pressure drop. However, due to the physical limits of fluid mechanics, there still exists a long-standing need for improved systems/devices and methods that facilitates in further reduction of the pressure drop, especially in high efficiency air filters.

SUMMARY

This summary is provided to introduce concepts related to an acoustic aided air filter and methods for air filtration and the concepts are further described below in the detailed description. This summary is not intended to identify essential features of the claimed subject matter nor it is intended for use in determining or limiting the scope of the claimed subject matter.

In one implementation, an air filter is disclosed. The air filter may comprise a filter media layer adapted to capture and filter one or more impurities from air. The air filter may further comprise one or more acoustic wave generating means attached at one or more sides of the filter media layer, wherein the one or more acoustic wave generating means generate acoustic waves to be propagated into the filter media layer. The propagation of the acoustic waves into the filter media layer may facilitate in increasing travel distance of the one or more impurities inside the filter media layer thereby enabling the filter media layer to intercept the one or more impurities. The propagation of the acoustic waves into the filter media layer may further facilitate in generating turbulence in the filter media layer thereby enabling the filter media layer to enhance the capturing of the one or more impurities based on enhanced turbulent diffusion effect. The propagation of the acoustic waves into the filter media layer may further facilitate in generating frictional electrostatic charges on the filter media layer thereby enabling the filter media layer to attract the one or more impurities.

In another implementation, a method of air filtration by an air filter is disclosed. The method may comprise capturing, via a filter media layer, one or more impurities from air. The method may further comprise generating, via one or more acoustic generating means, acoustic waves to be propagated into the filter media layer. The propagation of the acoustic waves into the filter media layer may facilitate in increasing travel distance of the one or more impurities inside the filter media layer thereby enabling the filter media layer to intercept the one or more impurities. The propagation of the acoustic waves into the filter media layer may further facilitate in generating turbulence in the filter media layer thereby enabling the filter media layer to enhance the capturing of the one or more impurities based on enhanced turbulent diffusion effect. The propagation of the acoustic waves into the filter media layer may further facilitate in generating frictional electrostatic charges on the filter media layer thereby enabling the filter media layer to attract the one or more impurities.

In yet another implementation, an air filtration apparatus is disclosed. The air filtration apparatus may comprise an air filter media layer. The air filtration apparatus may further comprise one or more acoustic wave generating devices attached at the one or more sides of the filter media layer, wherein the one or more acoustic wave generating devices generates acoustic waves to be propagated inside the air filter media layer thereby enabling the filter media layer to intercept and filter one or more impurities from the air. Further, the air filtration apparatus may comprise a frame securing the air filter media layer and the one or more acoustic wave generating devices. The air filtration apparatus may further comprise an electronic circuit or a pre-programmed chip to control frequency of the acoustic waves generated. Furthermore, the air filtration apparatus may comprise a power supply to power the one or more acoustic wave generating devices and the electronic circuit or the pre-programmed chip.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

Figure 1:
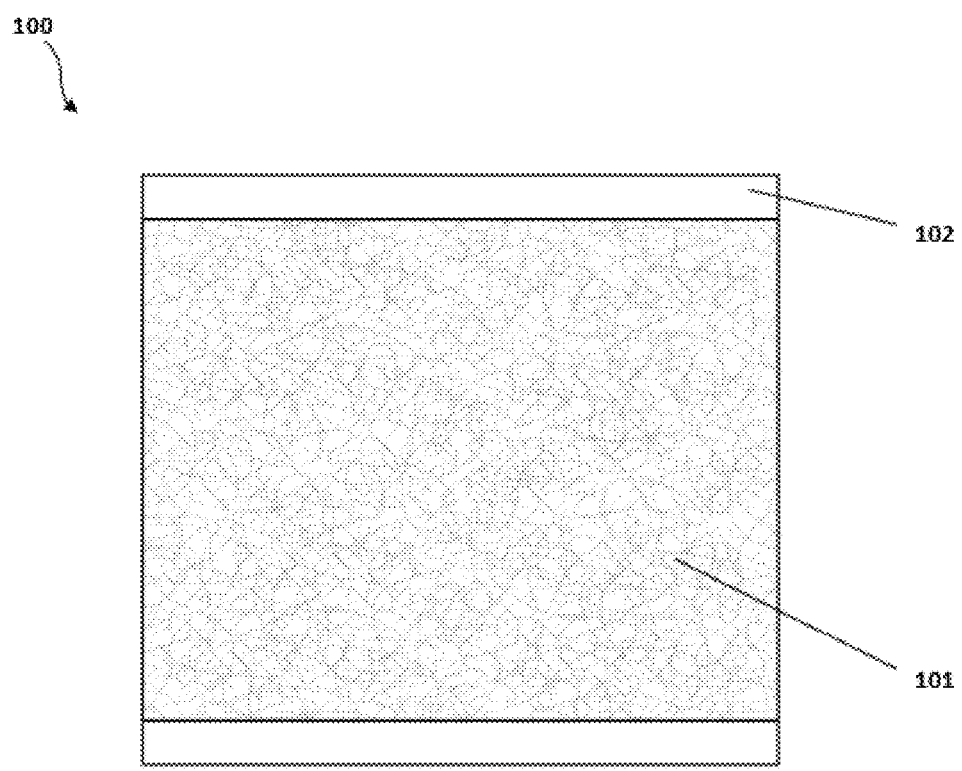
FIG. 1 illustrates a front view of an air filtration apparatus 100 including a filter media layer 101 and a frame 102, in accordance with an embodiment of the present application.

It is to be noted that the figures accompanying the present application are for illustrative purpose and are not drawn in scale. Further, the electrical wirings/cables and other electronic components of the Air filter are not shown in figures for clarity.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any apparatuses, devices and methods similar or equivalent to those described herein can be used in the practice or testing of embodiments of the present disclosure, the exemplary, apparatuses, devices and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present application relates to an air filtration apparatus (hereinafter also referred as "acoustic aided air filter" or "air filter" interchangeably) and an enhanced air filtration method with the aid of acoustic (sound) wave. The air filter proposed in the present application has high efficiency in capturing airborne particles with low pressure drop as compared to conventional air filters. Due to the lower pressure drop, the air filter proposed in the present application further consumes less energy during operation as compared to the conventional air filters. The air filtration method proposed in the present application is implemented to enhance the performance of other air filters. The air filter of the present application may be combined with other air filters to form air filtration systems or devices with higher efficiency. In accordance with embodiments of the present application, acoustic waves (sound waves) may be generated in order to enhance the filtration efficiency of air filter. Under low or medium frequency, acoustic waves induce vibratory motion on particles suspended in air. Due to the vibratory motion induced on the particles, the probability of hitting and attaching of the particles onto the solid surface of the filter media in the air filter is significantly increased. Given the large surface area of the porous air filter media, the acoustic waves significantly increase the probability of trapping the particles/impurities onto the air filter thereby enhancing the filtration efficiency. The filter media layer may further be an antimicrobial layer or a washable layer.

In an embodiment, the particles/impurities may further comprise one or more of dust, particles, airborne microorganism, virus and allergens. The filter media layer may be a porous layer made of material selected from a group comprising a natural fiber, a metal fiber, a metal foam and a synthetic fiber. The natural fiber may further comprise either a paper or a cotton. The synthetic fiber may further comprise a polyester plastic material.

In accordance with aspects of the present application, the acoustic waves may be generated by one or more acoustic wave generating devices selected from a group comprising a speaker, an acoustic transducer, an ultrasonic transducer, and a device including a single driver element or a voice coil used to move and control a diaphragm, and the like. The acoustic waves may be propagated into the porous air filter media and may be perpendicular to the air stream. The aforementioned air filtration method implemented by the air filter may enhance the filtration efficiency of air filter because of:

Increased travel distance of the particles inside the filter due to their additional vibration motions, making them easier to be intercepted by the filter media.

The air turbulence generated by the acoustic-driven air flow passing through the filter media resulting in increasing chance of the particles being captured by the filter media due to enhanced turbulent diffusion effect.

The acoustic-driven air flow generating additional frictional electrostatic charges on the filter media that facilitates in attracting the particles to the filter media.

It is to be noted that the airborne particles, independent of their size, may oscillate under the same amplitude inside low or medium frequency acoustic waves. Because of this phenomenon, the air filter of the present application may also remove smaller particles significantly more effectively than the conventional air filters. Since the acoustic waves do not increase pressure drop of the air stream passing through the air filter, the air filtration method of the present application does not increase the pressure drop of the air filter. Therefore, the air filtration method of the present application may be implemented using the air filter media with lower pressure drop to achieve a higher filtration efficiency.

In one exemplary embodiment, under the acoustic waves generated by a mini-scale speaker with only 3 Watts rated power in an Acoustic Aided Particulate Air Filter, submicron particles may be enabled to oscillate a few hundred times in a second with an amplitude of above 1.5 micrometers. Further, by applying the acoustic waves perpendicular to the air stream, very fine particles may be intercepted by the filter media as particles are larger than one micrometer in size. Using only a few Watts in generating the acoustic power, the filtration efficiency of an air filter is significantly improved without increasing the pressure drop of the air filter. Thus, both filtration and energy efficiencies of the air filter of the present application is significantly improved as compared to the conventional air filters. In an embodiment, based on engineering calculations, it is observed that the acoustic aided air filter consumes 30-50% less power than the conventional air filters with same filtration efficiency. As would be appreciated by those of ordinary skill in the art, having the benefit of the present application, the present application is not limited to any specific values of the rated power and the amplitude. Accordingly, any other values of the rated power and the amplitude may be realized without departing from the scope of the present application.

In an embodiment of the present application, two or more acoustic wave generating devices may be combined with a low/medium efficiency air filter media to form the acoustic aided particulate air filter. The acoustic wave generating devices and their fixture are characterized such that they are not consumable and may operate for long time, while the low/medium efficiency air filter media is a replaceable component.

The acoustic wave generating devices may be configured in a manner such that the acoustic waves generated propagates through the whole area and depth of the porous air filter. Further, the acoustic wave generating devices may be located in a manner such that the superposition of acoustic waves is minimized so as to avoid regions with low acoustic power inside the porous air filter. Extra-low voltage cable may be connected to the acoustic wave generating means for power supply.

In another embodiment, the air filtration method of the present application may use any porous air filter as the air filter media. The air filtration method of the present application may improve the filtration efficiency of the air filter without increasing the pressure drop across it.

It is to be noted that the performance of the acoustic aided particulate air filter enabling the optimization of the energy, filtration and cost is based on following parameters:

Frequency of the acoustic waves—Increasing the frequency of the generated acoustic waves may benefit the filtration efficiency but simultaneously results in increasing the power consumed by the speakers. Therefore, a balance between the frequency of the acoustic waves and the power consumption is desired, but the optimized frequency depends on the target filtration efficiency rating and the air filter used. Therefore, the frequency of the acoustic wave generated varies in different configurations of the Acoustic Aided Particulate Air Filter.

Displacement amplitude—The displacement amplitude of air in the acoustic wave directly affects the motion of air in the acoustic wave. Higher displacement amplitude of air results in greater vibration motion of particles in the filter media, which has positive impact to the filtration efficiency. However, to increase the displacement amplitude of air, the sound pressure level needs to be increased, which results in higher power consumption of the speakers. Therefore, a balance between the displacement amplitude and the power consumption is desired, but the optimized displacement amplitude depends on the target filtration efficiency rating and the air filter used. Therefore, the displacement amplitude varies in different configurations of the Acoustic Aided Particulate Air Filter.

Air filter media—The performance of the air filter of the present application may further depend on the air filter media used. The overall filtration efficiency depends on the material and fibre density of the air filter media used. Therefore, the air filter media varies in different configurations of the Acoustic Aided Particulate Air Filter.

In an exemplary embodiment, based on engineering calculations, it is observed that, in order to maintain a balance between energy and filtration efficiencies, an acoustic wave frequency in a range of 50 Hz to 1000 Hz and a displacement amplitude in a range of 1.5 to 2.2 μm is desired. In an exemplary embodiment of the present application, the frequency of the acoustic waves, the displacement amplitude and filtration efficiency rating of the synthetic fibre air filter in an Acoustic Aided Particulate Air Filter (with filtration efficiency rating about MERV 12 (ASHRAE 52.2-1999)) are 60-80 Hz, 1.5-1.8 μm and MERV 9 respectively. As would be appreciated by those of ordinary skill in the art, having the benefit of the present application, the present application is not limited to any specific values of the acoustic wave frequency and the displacement amplitude. Accordingly, any other values of the acoustic wave frequency and the displacement amplitude may be realized without departing from the scope of the present application.

Various embodiments of the present application will be described below in conjunction with the accompanying drawings.

Figure 4:
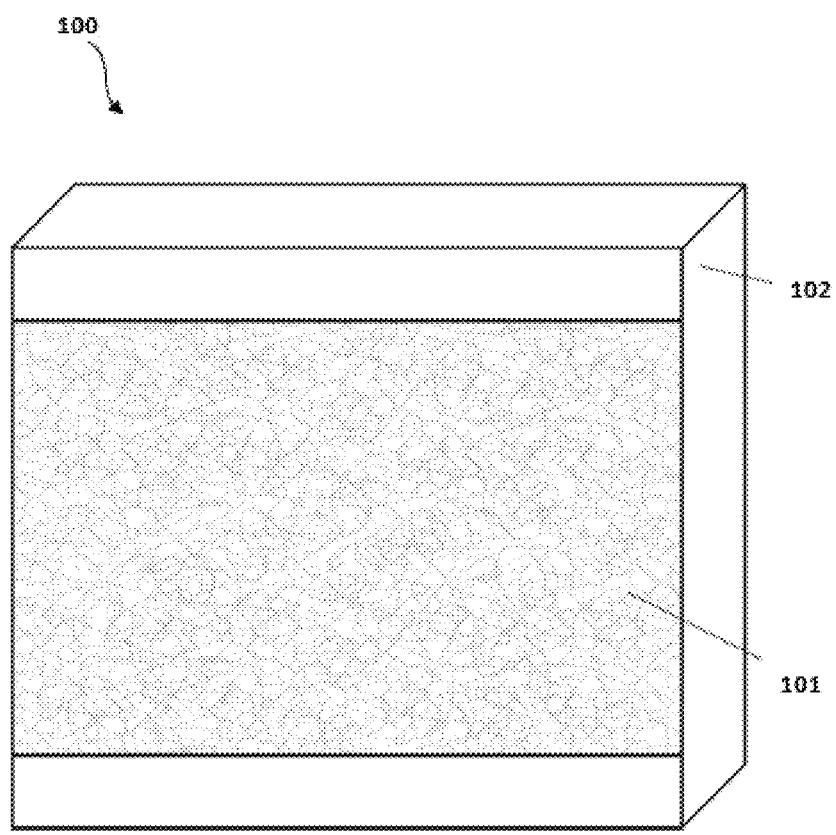
FIG. 4 illustrates a three-dimensional front view of the air filtration apparatus 100 including the filter media layer 101 and the frame 102, in accordance with an embodiment of the present application.

Referring to FIG. 1, a front view of an air filtration apparatus 100 (also referred as "Air filter 100" interchangeably) is illustrated, in accordance with an embodiment of the present application. Further, FIG. 4 illustrates a three-dimensional front view of the air filtration apparatus 100, in accordance with an embodiment of the present application. As shown in FIG. 1 and FIG. 4, the air filtration apparatus 100 may comprise an air filter media 101. The air filter media 101 may be a porous media made from either of a paper, a cotton, a synthetic fiber, polymer fiber, metal fiber and the like. As shown, the air filter media 101 may be secured by a frame 102. The frame 102 may be made from material selected from a group comprising paper, metal, plastic, and ceramic, etc. The air filter media 101 and the frame 102 may be replaceable and disposable. The air filtration apparatus 100 may further comprise one or more components/devices collectively enabling the air filtration, details of which are described further in conjunction with the corresponding drawings as below.

Figure 2:
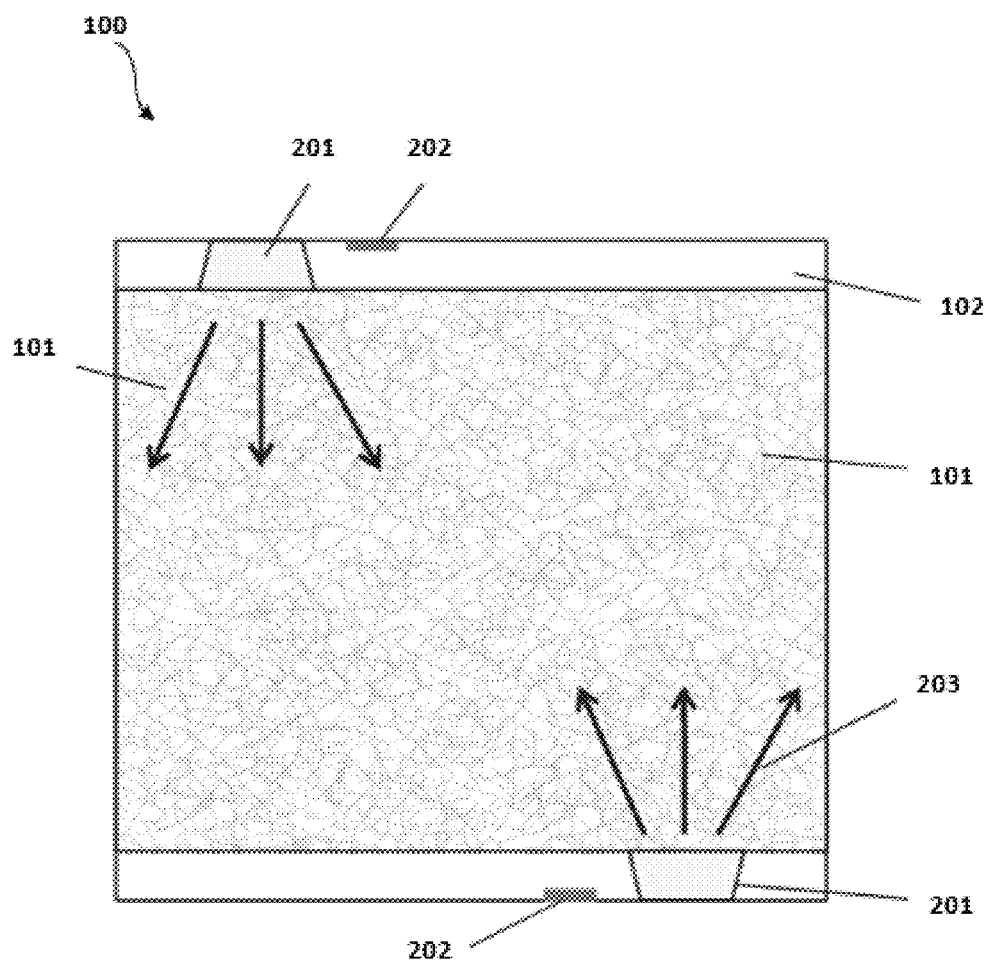
FIG. 2 illustrates a cross-sectional view of the air filtration apparatus 100 including one or more acoustic wave generating means 201 inside the frame 102, in accordance with an embodiment of the present application.

Referring to FIG. 2, a cross-sectional view of the air filtration apparatus 100 including one or more acoustic wave generating means 201 inside the frame 102 is illustrated, in accordance with an embodiment of the present application. As shown, the acoustic wave generating means 201 may be secured in the frame 102. The number and location of the acoustic wave generating means 201 may vary depending on the size of the acoustic aided air filter 100. The acoustic wave generating means 201 may further include one of speakers with a plurality of pre-set frequencies, speakers with viable frequency control, full range speakers, full range speakers with pre-set frequency, full range speakers with viable frequency control, Mylar speakers, Mylar speakers with pre-set frequency, Mylar speakers with viable frequency control, acoustic transducers, acoustic transducers with pre-set frequency, acoustic transducers with viable frequency control, ultrasonic transducers, ultrasonic transducers with pre-set frequency, ultrasonic transducers with viable frequency control, and the like. The acoustic wave generating means 201 may be controlled via a pre-programmed chip 202 (e.g. a frequency control chip) as shown in FIG. 2. The acoustic wave generating means 201 may generate acoustic waves which propagate into the air filter media 101. The acoustic waves propagate in the direction 203 towards the air filter media 101 as shown in FIG. 2.

In an embodiment, the air filter 100 may further comprise a battery (not shown in Figures) configured to supply power to the one or more acoustic generating means 201 and the pre-programmed chip 202. The battery connection may be further replaced by an electrical power supply connection to power the one or more acoustic generating means 201 and the pre-programmed chip 202.

Figure 3:
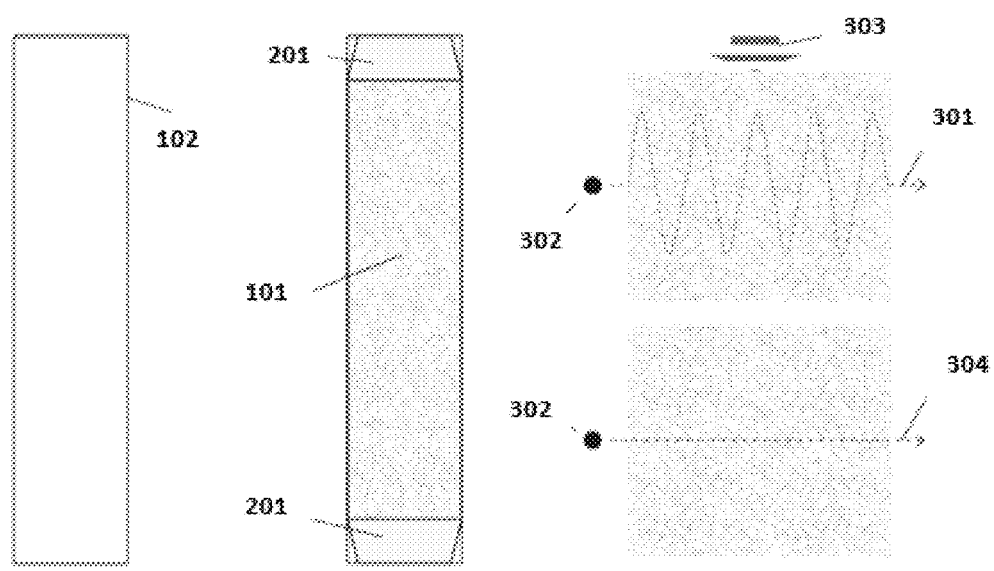
FIG. 3 illustrates a side view and the cross-sectional view of the air filtration apparatus 100 including the filter media layer 101 and the one or more acoustic wave generating means 201 in the frame 102, in accordance with an embodiment of the present application.

Referring to FIG. 3, a side view and the cross-sectional view of the air filtration apparatus 100 including the filter media layer 101 and the one or more acoustic wave generating means 201 in the frame 102 is illustrated, in accordance with an embodiment of the present application. In order to obtain an optimized performance, the frame 102 may be adapted to enclose the air filter media 101 without any void on the sides. The acoustic wave generating means 201 may be secured on the top and bottom space inside the frame 102. The right most top of FIG. 3 illustrates additional vibration motion of the airborne particles as induced by the acoustic wave. Further, a trajectory 301 (in form of a waveform) of a particle 302 passing through the air filter media under the control of an acoustic wave 303 generated via an acoustic wave generating device 201 is shown. Further, in the right most bottom of the FIG. 3, a trajectory 304 (in form of a line) in which the particle passing through the air filter media without using the acoustic wave is shown.

Figure 5:
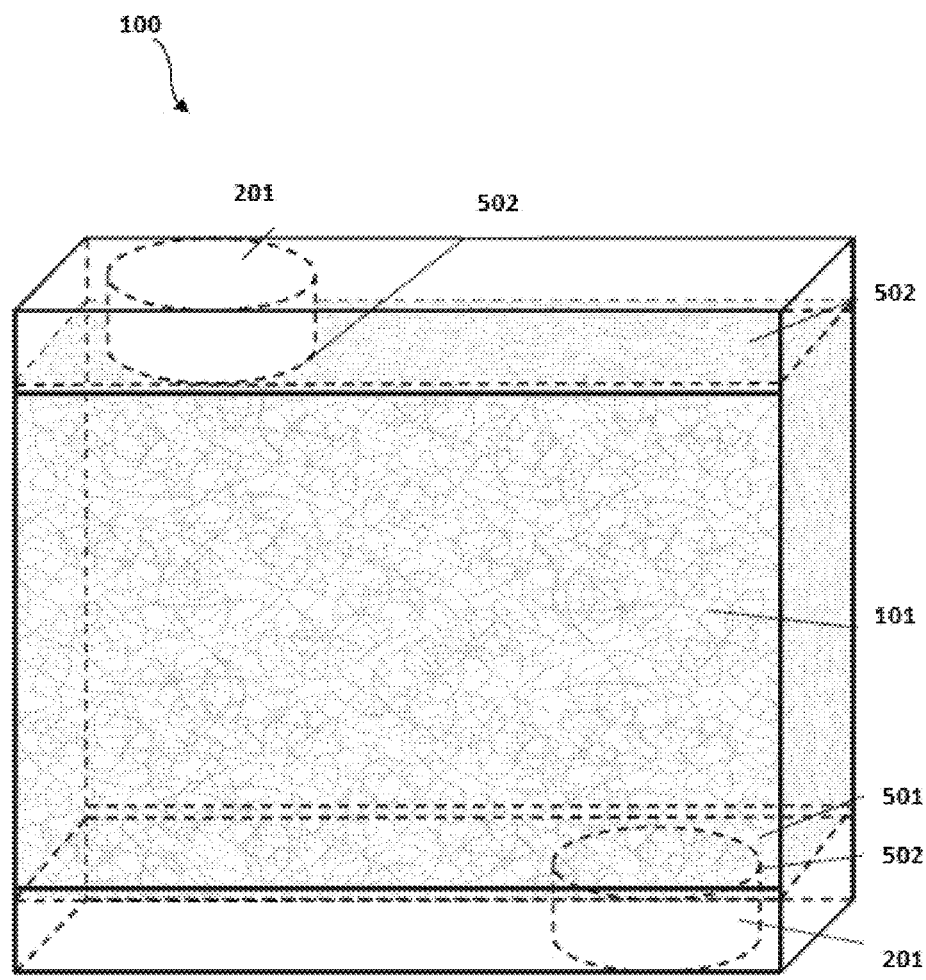
FIG. 5 illustrates a three-dimensional transparent front view of the air filtration apparatus 100 including the filter media layer 101 and the one or more acoustic wave generating means 201, in accordance with an embodiment of the present application.

Referring to FIG. 5, a three-dimensional transparent front view of the air filtration apparatus 100 including the filter media layer 101 and the one or more acoustic wave generating means 201 is illustrated, in accordance with an embodiment of the present application. As shown in FIG. 5, the frame 102 may comprise two horizontal plates 501 to secure the air filter media 101. The two horizontal plates 501 may prevent air particles from entering the spaces on top and bottom of the air filter 100. Each of the two horizontal plates 501 may have openings 502 to enable the acoustic waves, generated by the acoustic wave generating means 201, to propagate into the air filter media 101.

Figure 6:
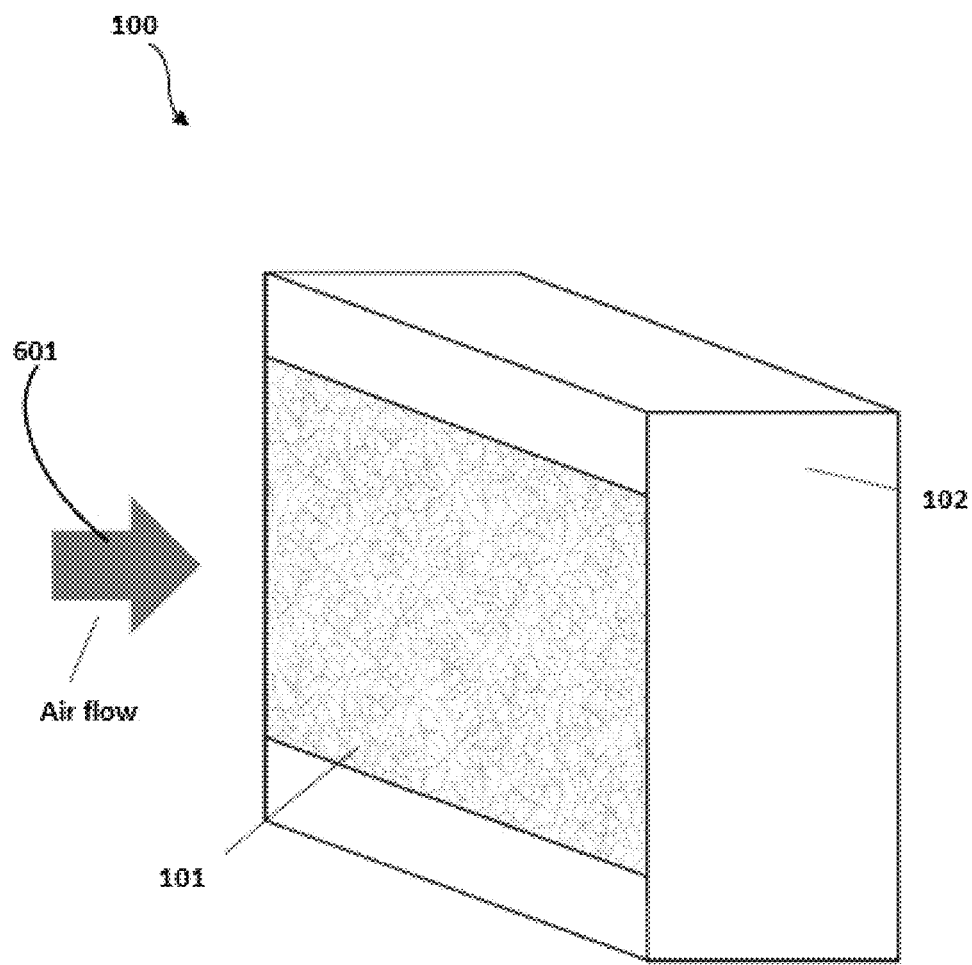
FIG. 6 illustrates a three-dimensional side view of the air filtration apparatus 100, in accordance with an embodiment of the present application.
Figure 7:
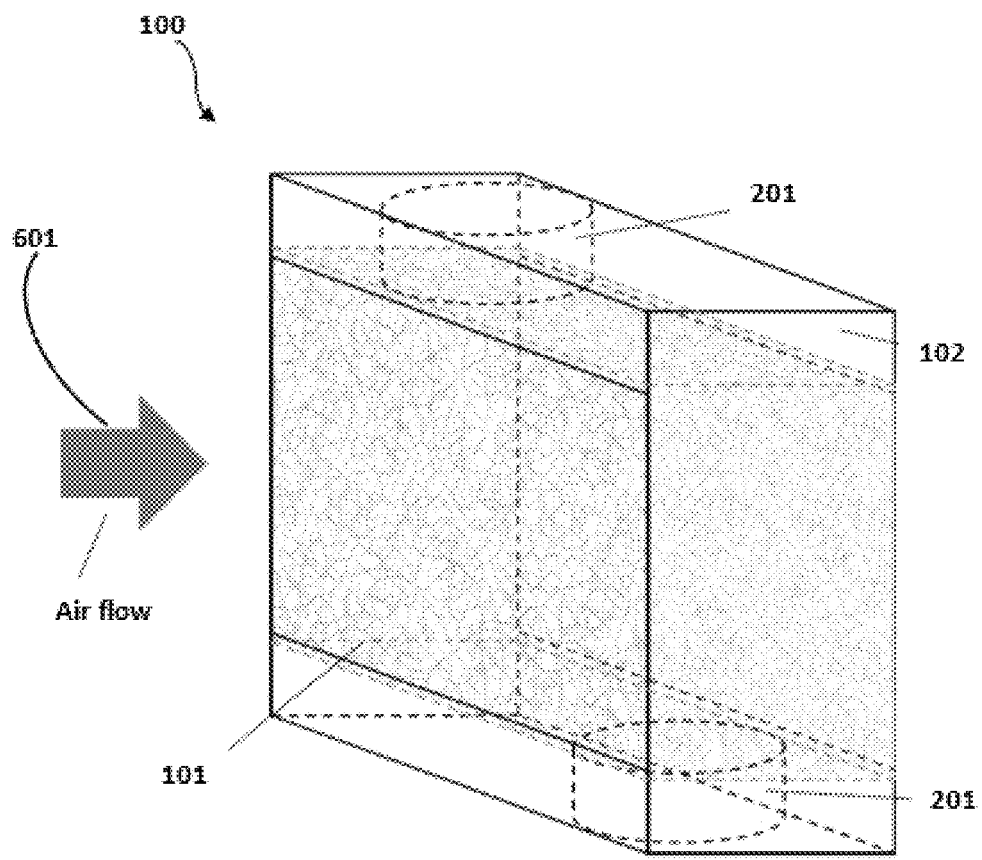
FIG. 7 illustrates a three-dimensional transparent side view of the air filtration apparatus 100 including the one or more acoustic wave generating means 201, in accordance with an embodiment of the present application.

Referring to FIG. 6 and FIG. 7, a three-dimensional side view and a three-dimensional transparent side view, respectively, of the air filter 100 are illustrated. As shown in FIG. 6, air flows in direction 601 towards the air filter 100. The air is passed through the air filter 100, where the acoustic wave generating devices 201 may generate acoustic wave propagating into the air filter media. The acoustic waves may induce additional vibration motions of air particles in the air stream, which may increase the probability of the particles trapping onto the filter 100. The working of an exemplary acoustic aided air filter 100 along with its test, results of the test and analysis of the results is further described in accordance with an exemplary embodiment in reference to FIG. 8-FIG. 10 as below.

The Acoustic Aided Air Filter

Figure 8:
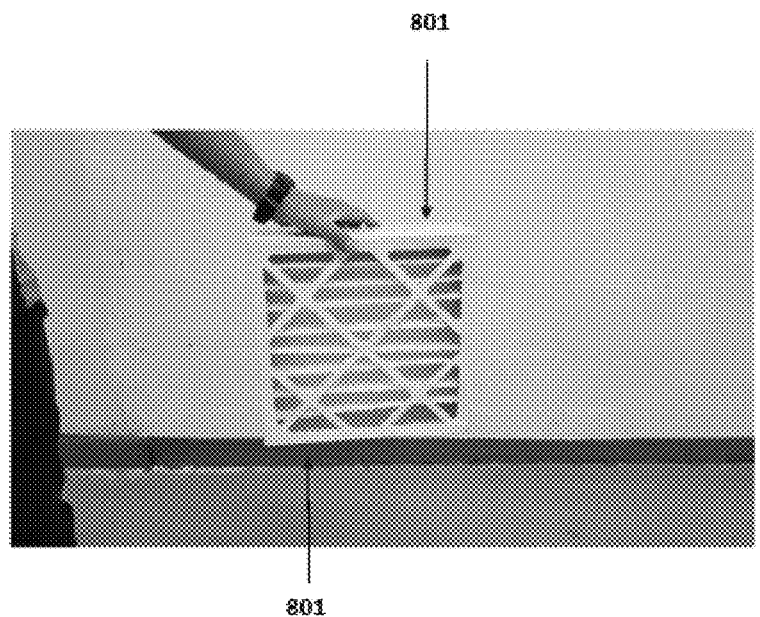
FIG. 8 illustrates a plurality of locations of openings, in accordance with an embodiment of the present application.
Figure 9:
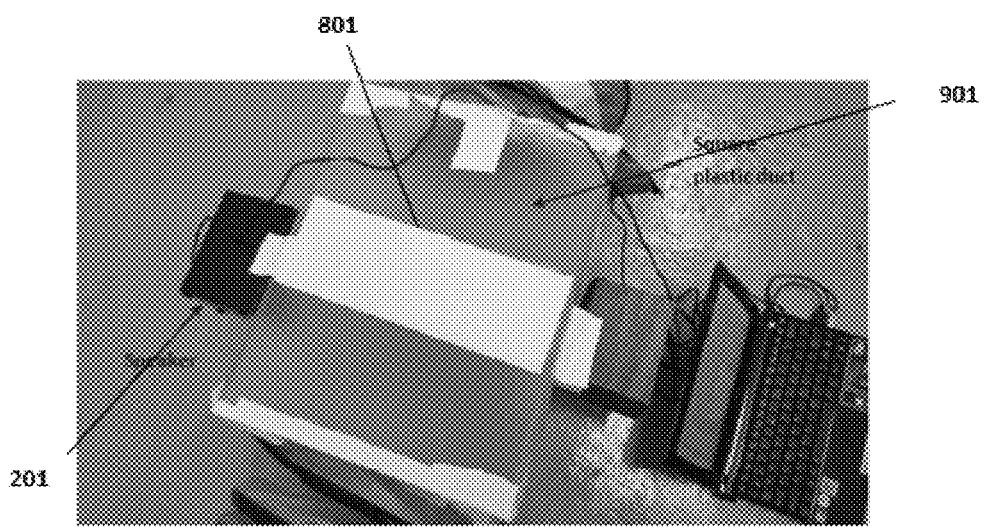
FIG. 9 illustrates a square plastic duct 901, full range speakers 201 and a computer of the air filtration apparatus 100, in accordance with an embodiment of the present application.

In an exemplary embodiment, an Acoustic Aided Particulate Air Filter was constructed based on a fiber pleated media filter having a length of 12 inches, width of 12 inches and thickness 4 inches. The said filter is classified as F5 in accordance with EN799. The fiber pleated media filter has a paper frame. Two round openings, each of 8 cm diameter, were cut on the paper frame to allow acoustic wave to propagate into the fiber pleated media from the sides. The locations of the openings 801 are indicated in FIG. 8. The filter was then fixed in a square plastic duct with two openings on the side matching the locations of the openings on the filter paper frame. Two full range speakers were used to generate acoustic waves. They were connected to a computer and were fixed to have their diaphragms aligned with the two openings. The speakers were controlled by a frequency generator software installed in the computer. FIG. 9 shows a square plastic duct 901, full range speakers 201 and the computer. The speakers may be replaced by thin mini-speakers/Mylar speakers embedded into the filter frame. Also, a pre-set frequency signal chip may be built into the frame to replace the computer control. The testing of the acoustic aided filter using various facilities and instruments is further described referring to FIG. 10 as below.

Facilities and Instruments

Figure 10:
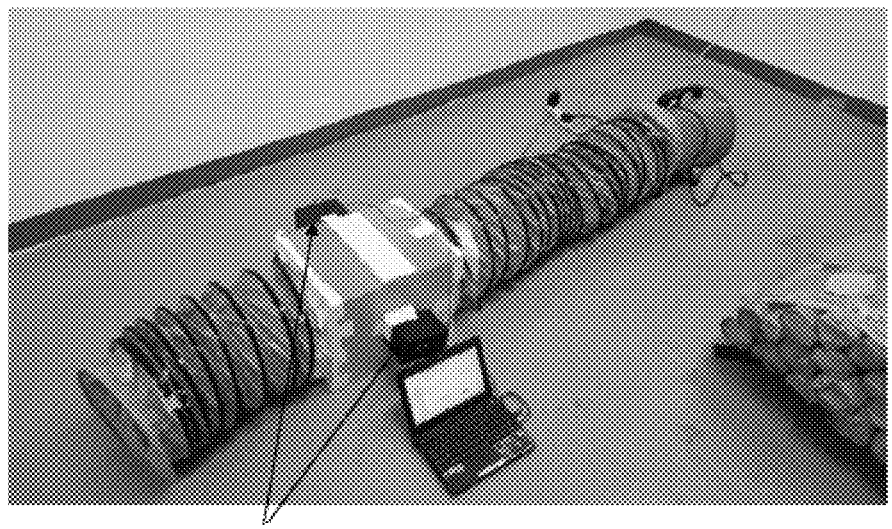
FIG. 10 illustrates an experimental set up containing flexible ducts and air blower connected to the square plastic duct for testing the air filtration apparatus 100, in accordance with an embodiment of the present application.

The test was conducted in a 40 m² room. There was no other activity in the room during the test. As shown in FIG. 10, two flexible ducts were connected to the square plastic duct. Further, as shown, an air blower (550 W model, Jia Yi) was connected to the other end of the longer flexible duct. The air blower drove air through the filter and the flexible duct. All connections were well sealed. FIG. 10 shows the connected flexible ducts and the air blower.

The following measurement instruments were used in the test:

| Manufacturer | Type/Model No. | Equipment |
| --- | --- | --- |
| Met One | Aerocet-531S | Portable particle counter |

| Manufacturer | Type/Model No. | Equipment |
| --- | --- | --- |
| Delta Ohm | HD2010UC/A | Sound level meter |

| Manufacturer | Type/Model No. | Equipment |
| --- | --- | --- |
| Skywatch | Xplorer 1 | Anemometer |

The portable particle counter was used to measure the particle concentrations in PM 1, PM 2.5 and PM 10 with and without the effect of acoustic wave. The sound level meter was used in measuring and adjusting the sound power output (in dB) of the speakers. The anemometer was used in measuring and adjusting the flow velocity of the air blower. All measurement instruments were calibrated within 1 year from the testing day.

Test Methodology

Particles from fuming incense were used as test particles. The particles from fuming incense were passed into the middle section of the flexible duct around 1.5 m distance before the square plastic duct 901 (shown in FIG. 9) through an opening. The steady-state particle concentrations after the filter, with and without the speakers turned on, were measured for comparison. All measurements were repeated for 3 times and average values were used in the comparison and analysis. A total of 3 different acoustic wave frequencies, 65 Hz, 150 Hz and 300 Hz, with 2 different flow velocities (~0.5 m/s and ~1 m/s) were considered in the testing.

Results

Under acoustic wave of 65 Hz and 150 Hz, the particle concentrations were reduced by 8% to over 50% (average reduction: 26.9%) when compared to the concentrations without the acoustic wave. For acoustic wave of 300 Hz, the concentration reductions were generally lower than 65 Hz or 150 Hz. Table 1 below summaries the testing results.

TABLE 1

Summary of concentration data and concentration reduction (concentration unit: μg/m3)

|  | Without Acoustic Wave | With Acoustic Wave | % Reduction | Without Acoustic Wave | With Acoustic Wave | % Reduction | Without Acoustic Wave | With Acoustic Wave | % Reduction |
| --- | --- | --- | --- | --- | --- | --- | --- | --- | --- |
| Condition | 65 Hz, 81 dB, 1 m/s | | | 65 Hz, 81 dB, 0.6 m/s | | | | | |
| PM 1 | 19.2 | 12.7 | 33.9 | 13.2 | 9.3 | 29.7 | | | |
| PM 2.5 | 24.3 | 16.2 | 33.3 | 14.7 | 11.7 | 20.9 | | | |
| PM 10 | 27 | 19.9 | 26.3 | 20 | 15.7 | 21.8 | | | |
| Condition | 150 Hz, 81 dB, 0.8 m/s | | | 150 Hz, 81 dB, 0.5 m/s | | | 300 Hz, 86 dB, 0.5 m/s | | |
| PM 1 | 16.4 | 9.9 | 39.9 | 13.3 | 6.6 | 50.4 | 6.9 | 6.5 | 5.8 |
| PM 2.5 | 15.7 | 12.6 | 19.7 | 16.4 | 12.2 | 25.6 | 9.4 | 8.7 | 7.4 |
| PM 10 | 20.8 | 18.1 | 12.8 | 18.5 | 17 | 8.1 | 14 | 11.4 | 18.6 |

Based upon the results illustrated above, it is observed that the Acoustic Aided Particulate Air Filter could significantly reduce the concentration of airborne particles. Generally, the Acoustic Aided Particulate Air Filter device could reduce the concentration of smaller particles (PM 1 and PM 2.5) more effectively than larger particles (PM 10).

Analysis

The testing results indicate that Acoustic Aided Particulate Air Filter enhances the filtration efficiency of the air filter. The results suggest that higher frequency may not improve the efficiency. This could be related to the magnitude of the vibration motion induced by the acoustic wave on the particles. Although higher acoustic wave frequency increases the frequency of vibration of airborne particles, however, the higher acoustic wave frequency also reduces the magnitude of the particle vibration motion under the same sound pressure level. This is also favorable from the energy efficiency aspect, as less energy to generate a lower frequency acoustic wave is required. Further, it is observed that the flow velocity does affect the efficiency of the Acoustic Aided Particulate Air Filter. In practice, the frequency and sound power level should be selected for an optimized performance over the common range of air flow velocity. Current device was based on an EN799 F5 grade filter. It is expected that the performance of the Acoustic Aided Particulate Air Filter may be further enhanced when combined with higher grade filters since they have denser fiber media.

The sound pressure level used in the 65 Hz and 150 Hz tests were about 55 and 65 dBA respectively. These sound levels are quieter than MVAC plant room and shall be even lower when the system is operated in duct. Therefore, the system should have little-to-no contribution to hearing noise. Smaller airborne particles have greater impacts on health and clean manufacturing. The Acoustic Aided Particulate Air Filter could enhance the removal of PM 1 and PM 2.5 significantly. Therefore, the Acoustic Aided Particulate Air Filter of the present application has promising applications in healthcare and clean manufacturing domains.

Although implementations for apparatuses, devices and methods for air filtration have been described in language specific to structural features and/or methods, it is to be understood that the appended claims are not necessarily limited to the specific features or apparatuses, devices and methods described. Rather, the specific features and apparatuses, devices and methods are disclosed as examples of implementations for the air filtration.

What is claimed is:

1. An air filter, comprising:
    a frame comprising an antimicrobial filter media layer and two horizontal plates placed at opposite sides of the antimicrobial filter media layer, wherein the antimicrobial filter media layer is adapted to capture and filter one or more impurities from air, and wherein each horizontal plate further comprises one or more acoustic wave generating means adapted for generating acoustic waves at variable frequency, one or more frequency control chips adapted for controlling the variable frequency, and wherein each horizontal plate prevents the air particles from entering the spaces from the one or more sides, and wherein each horizontal plate has openings to enable the acoustic waves generated by the one or more acoustic wave generating means to be propagated into the antimicrobial filter media layer, and wherein the acoustic waves generated are perpendicular to the direction of the displacement of the one or more impurities, wherein the propagation of the acoustic waves into the antimicrobial filter media layer enables the antimicrobial filter media layer to capture the impurities by facilitating in
    increasing travel distance of the impurities inside the antimicrobial filter media layer thereby enabling the antimicrobial filter media layer to intercept the one or more impurities,
    generating turbulence in the antimicrobial filter media layer thereby enabling the antimicrobial filter media layer to enhance the capturing of the one or more impurities based on enhanced turbulent diffusion effect and generating frictional electrostatic charges on the antimicrobial filter media layer thereby enabling the antimicrobial filter media layer to attract the one or more impurities.

2. The air filter of claim 1, wherein the one or more impurities comprise one or more of dust, particles; airborne microorganism, virus and allergens.

3. The air filter of claim 2, wherein the antimicrobial filter media layer is a porous filter layer made of a material selected from a group consisting of a natural fiber, a metal fiber, a metal foam and a synthetic fiber, and wherein the antimicrobial filter media layer is capable to either kill, inactivate or remove one or more of the airborne microorganism, the virus and the allergens from the air.

4. The air filter of claim 3, wherein the natural fiber is a paper or a cotton.

5. The air filter of claim 3, wherein the synthetic fiber is a polyester plastic material.

6. The air filter of claim 1, wherein the frame is made of a paper or a plastic or a metal, and wherein the frame is capable of being reused or disposed with the air filter.

7. The air filter of claim 1, wherein the one or more acoustic wave generating means comprises either of a speaker, an acoustic transducer, an ultrasonic transducer, and a device including a single driver element or a voice coil used to move and control a diaphragm, wherein the one or more acoustic wave generating means is configured to generate the acoustic waves with frequency varying from 50 Hz to 1000 Hz and a displacement amplitude varying from 1.5 to 2.2 μm.

8. The air filter of claim 7, wherein the speaker is either of a speaker with a plurality of pre-set frequencies, a speaker with a viable frequency control, a full range speaker, a full range speaker with a pre-set frequency, a full range speaker with a viable frequency control, a Mylar speaker, and a Mylar speaker with a pre-set frequency.

9. The air filter of claim 8 further comprising a battery or an electrical connection configured to supply power to the one or more acoustic wave generating means and one or more frequency control chips.

* * * * *